United States Patent
Suzuki

(10) Patent No.: US 8,683,608 B2
(45) Date of Patent: Mar. 25, 2014

(54) COMMUNICATION METHOD, DISPLAY APPARATUS, MODERATOR TERMINAL APPARATUS, USER TERMINAL APPARATUS, AND MULTI-USER COMMUNICATION SYSTEM INCLUDING THE SAME

(75) Inventor: Yoshihiro Suzuki, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 257 days.

(21) Appl. No.: 13/096,266

(22) Filed: Apr. 28, 2011

(65) Prior Publication Data

US 2011/0283364 A1 Nov. 17, 2011

(30) Foreign Application Priority Data

May 14, 2010 (JP) ................................ 2010-112232

(51) Int. Cl.
*H04L 29/06* (2006.01)
(52) U.S. Cl.
USPC .......................................................... 726/28
(58) Field of Classification Search
None
See application file for complete search history.

(56) References Cited

U.S. PATENT DOCUMENTS

| | | | |
|---|---|---|---|
| 2004/0260753 A1 | 12/2004 | Regan | |
| 2005/0160479 A1* | 7/2005 | Kubota | ........................... 726/16 |
| 2005/0198578 A1 | 9/2005 | Agrawala et al. | |
| 2007/0112849 A1* | 5/2007 | McMullen et al. | ........ 707/103 R |
| 2008/0141146 A1* | 6/2008 | Jones et al. | ..................... 715/753 |
| 2008/0289031 A1* | 11/2008 | Anno | ............................... 726/17 |

FOREIGN PATENT DOCUMENTS

| | | |
|---|---|---|
| JP | 2000-194875 | 7/2000 |
| JP | 2002-215553 | 8/2002 |
| JP | 2005-011333 | 1/2005 |
| JP | 2005-222535 | 8/2005 |
| JP | 2007-524929 | 8/2007 |
| WO | 2005/114383 A2 | 12/2005 |

* cited by examiner

*Primary Examiner* — David Pearson
(74) *Attorney, Agent, or Firm* — Morgan, Lewis & Bockius LLP

(57) ABSTRACT

In a multi-user communication system in which communication is carried out between a display apparatus and multiple information terminal apparatuses (a moderator terminal apparatus and a user terminal apparatus) over a network, the moderator terminal apparatus sends, to the display apparatus, a data ID (ID information) for identifying data to be displayed in a display unit of the display apparatus, user information indicating a user that is an owner of that data, and access rights information that is set for each user using the information terminal apparatuses and that indicates whether or not the generation and changing of that data is permitted. The display apparatus displays the data identified by the data ID (ID information) in the display unit based on the user information and the access rights information.

24 Claims, 11 Drawing Sheets

```
<div style="position: absolute, top: 10px, left: 10px, z-index: 1", id="211",
creation-date="2010-01-21T10:33Z", update-date="2010-01-21T10:45Z",
owner="nick", access="nick only">
Meeting for next annual budget
</div>
```

Fig. 8

COMMUNICATION METHOD, DISPLAY APPARATUS, MODERATOR TERMINAL APPARATUS, USER TERMINAL APPARATUS, AND MULTI-USER COMMUNICATION SYSTEM INCLUDING THE SAME

This application is based on Japanese Patent Application No. 2010-112232, filed on May 14, 2010, the contents of which are hereby incorporated by reference.

BACKGROUND OF THE INVENTION

1. Field of the Invention

The present invention relates to a communication method, a display apparatus, a moderator terminal apparatus, a user terminal apparatus, and a multi-user communication system including the same.

2. Description of Related Art

Electronic conference systems in which personal computers serving as information terminal apparatuses connect to each other over a network and which electronically share documents, memos, and so on have been in use for some time. An electronic conference is realized, for example, by personal computers connecting over a network and sharing data such as documents, displayed page positions of those documents, memos, and so on via the network.

JP-2002-215553A (in particular, FIG. 8 and FIGS. 10 to 12), JP-2005-011333A, JP-2000-194875A, JP-2005-222535A, JP-2007-524929A, and so on disclose electronic conference systems that display the desktop of a certain personal computer on a screen, and the proceedings are advanced, information is transmitted, questions are answered, and so on using terminals that are connected to each other over a network.

For example, JP-2002-215553A discloses a technique for providing a chat room by imparting authority on users who can participate in an information sharing space. However, with the technique disclosed in JP-2002-215553A, it is necessary to install various servers such as AP servers, HTTP servers, chat servers, database servers, and so on, and link those servers with access rights.

For this reason, with the technique disclosed in JP-2002-215553A, there is a problem in that it is necessary to install various servers and link those servers with access rights in the case where authority is to be imparted on users and written content from a certain terminal apparatus, a personal computer, and so on is to be displayed in a display such as a screen.

SUMMARY OF THE INVENTION

Having been devised in light of the aforementioned problem, it is an object of the present invention to provide a communication method, display apparatus, moderator terminal apparatus, user terminal apparatus, and multi-user communication system including the same that enable communication to be carried out smoothly among multiple users by controlling information in accordance with access rights of each of the multiple users.

In order to achieve the aforementioned object, a communication method according to the present invention includes communicating between a display apparatus and multiple information terminal apparatuses over a network, where the multiple information terminal apparatuses include a moderator terminal apparatus that controls data to be displayed in a display unit of the display apparatus; the moderator terminal apparatus sends, to the display apparatus, ID information for identifying the data to be displayed in the display unit of the display apparatus, user information indicating a user that is an owner of the data, and access rights information that is set on a user-by-user basis for users that use the multiple information terminal apparatuses and that indicates whether or not generation and changing of the data is permitted; and the display apparatus displays the data identified by the ID information in the display unit based on the user information and the access rights information.

Furthermore, in order to achieve the aforementioned object, a display apparatus according to the present invention includes: a display unit; and a communication unit that communicates with multiple information terminal apparatuses including a moderator terminal apparatus and a user terminal apparatus over a network, where the communication unit receives, from the moderator terminal apparatus that controls data to be displayed in the display unit, ID information for identifying the data, user information indicating an owner of the data, and access rights information that is set on a user-by-user basis for users that use the multiple information terminal apparatuses and that indicates whether or not generation and changing of the data is permitted, and receives, from the user terminal apparatus, the data to be displayed in the display unit, the ID information, and the user information indicating the owner of the data; and the display unit displays the data identified by the ID information based on the user information and the access rights information.

Furthermore, in order to achieve the aforementioned object, a moderator terminal apparatus according to the present invention includes a communication unit that sends, to a display apparatus, ID information for identifying data to be displayed in a display unit of the display apparatus, user information indicating an owner of the data, and access rights information that is set on a user-by-user basis for users using information terminal apparatuses that communicate with the display apparatus over a network and that indicates whether or not generation and changing of the data is permitted.

Furthermore, in order to achieve the aforementioned object, a user terminal apparatus according to the present invention includes a communication unit that sends, to a display apparatus, data to be displayed in a display unit of the display apparatus, ID information for identifying the data, and user information indicating an owner of the data.

Furthermore, in order to achieve the aforementioned object, a multi-user communication system according to the present invention is a multi-user communication system in which the stated display apparatus and multiple information terminal apparatuses including the stated moderator terminal apparatus and the stated user terminal apparatus communicate over a network.

According to the present invention, data can be controlled based on ID information and the data can be controlled in accordance with access rights to the data set on a user-by-user basis for multiple users participating in the communication (that is, whether or not the generation and changing of the data is permitted). Therefore, it is possible to enable smooth communication that is compliant with the access rights among the respective multiple users.

Further features and advantages of the present invention will be made clear through the embodiment described hereinafter.

BRIEF DESCRIPTION OF THE DRAWINGS

FIG. 8 is a diagram illustrating an example of display information according to an embodiment of the present invention.

DETAILED DESCRIPTION OF PREFERRED EMBODIMENTS

Figure 1:
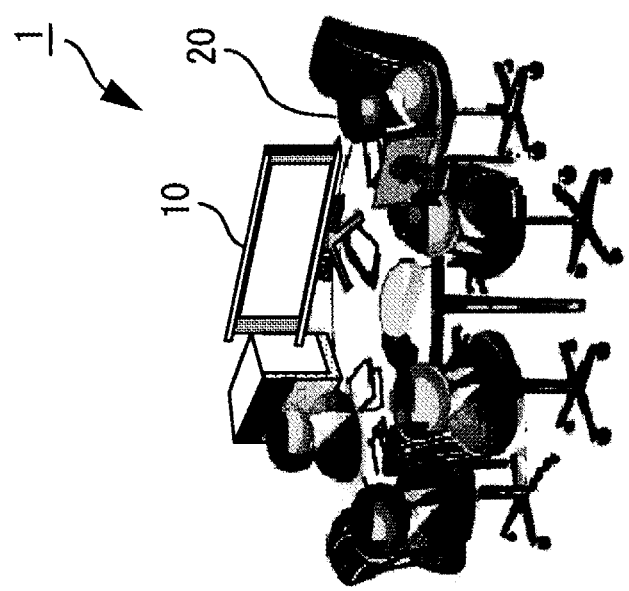
FIG. 1 is a conceptual diagram illustrating an example of a multi-user communication system according to the present invention.

A multi-user communication system according to the present invention will be described hereinafter with reference to the drawings. FIG. 1 is a conceptual diagram illustrating an example of the multi-user communication system according to the present invention. As illustrated in FIG. 1, the multi-user communication system according to the present invention can, through communication over a network, be used as a chat system in which multiple users can converse in real-time, an electronic conference system in which multiple users who have joined a virtual conference room can present ideas and opinions, and so on. Hereinafter, an electronic conference system 1 will be described as an example.

Figure 2:
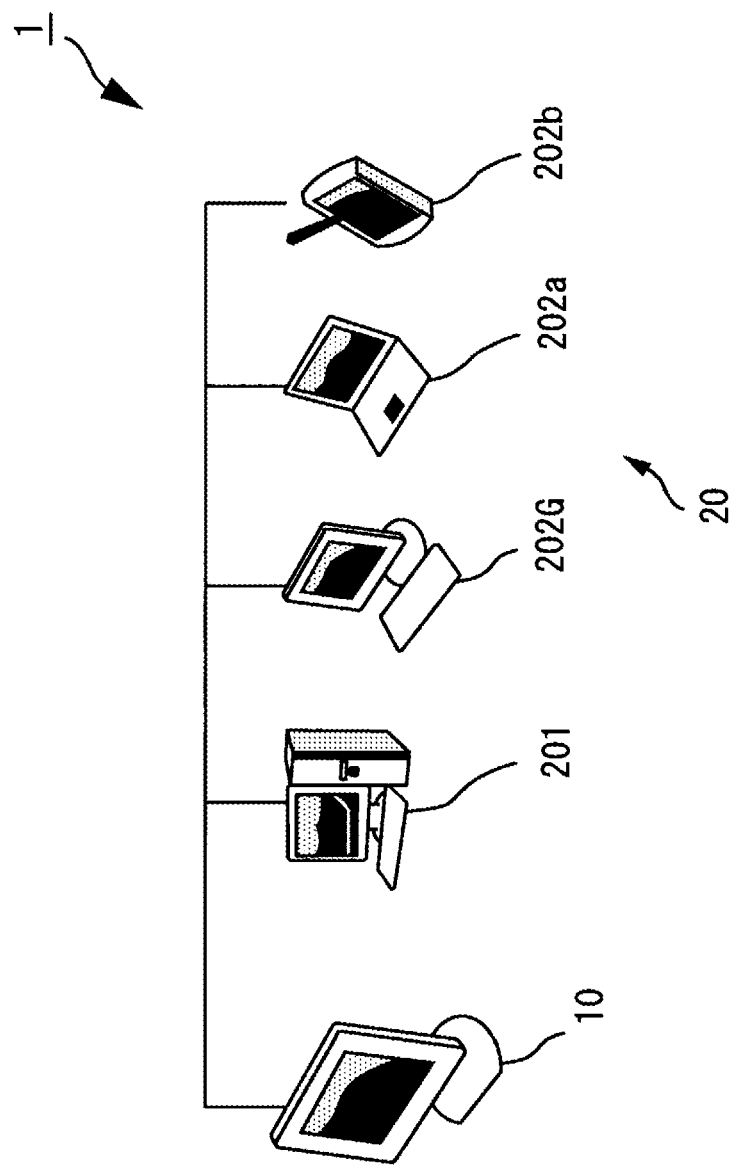
FIG. 2 is a structural diagram illustrating the configuration of an electronic conference system according to an embodiment of the present invention.

FIG. 2 is a structural diagram illustrating the configuration of an electronic conference system according to an embodiment of the present invention. As illustrated in FIG. 2, in the electronic conference system 1, a display apparatus 10 and multiple information terminal apparatuses 20 (201, 202G, 202a, and 202b) communicate over a network. Here, any communication medium that enables mutual communication may be used as the information transmission means between the respective information terminal apparatuses 20; a LAN, a WAN, the Internet, and so on can be given as examples.

Meanwhile, the electronic conference system 1 is configured using XMPP (Extensible Messaging and Presence Protocol), which will be described later; the display apparatus 10 and the multiple information terminal apparatuses 20 may carry out communication based on XMPP over a network. Doing so enables real-time messaging (information exchange) in the communication between the display apparatus 10 and the multiple information terminal apparatuses 20. The following descriptions are given assuming that the electronic conference system 1 carries out communication based on XMPP.

Here, XMPP as used by the electronic conference system 1 in the present embodiment will be described. XMPP is an XML-based protocol (communication protocol) whose regulation/standardization are being developed by the XSF (XMPP Standards Foundation) that branched off from the XMPP workgroup of the IETF (Internet Engineering Task Force); XMPP dynamically controls a wide range of applications including instant messaging, presence (that is, what sort of status a partner is in), multi-user chat, audio and video telephone, task collaboration, content syndication, general routing of XML data, and so on, and is realized as a multiple-extension protocol (XEP: XMPP Extension Protocol) standardized in accordance with those respective purposes in order to carry out real-time communication using a communication system such as the Internet.

The electronic conference system 1 according to the present embodiment uses various protocols (communication protocols) defined by XMPP. Here, in order to facilitate the understanding of the electronic conference system 1 according to the present embodiment, XEP-0045 (Multi-User Chat) and XEP-0071 (XHTML-IM), which are important protocols, will be described.

XEP-0045 (Multi-User Chat) is a protocol (communication protocol) that defines a multi-user chat function in which multiple XMPP users can exchange messages within a specific community (chat room) in a virtual space over a network. In addition to standard chat functions such as posting topics to the chat room, inviting users to the chat room, and so on, this protocol also defines a model for controlling the chat room through functions such as kicking and banning users, assigning roles and affiliations, which will be described later, to users of the chat room, and so on.

Here, "role" refers to a temporary position or authority level assigned to a user participating in the chat. In XEP-0045 (Multi-User Chat), a "moderator" who can kick users and delete posts made by users, a "participant" who has the right to make posts, a "visitor" who does not have the right to make posts, and so on are defined. Meanwhile, "affiliation" refers to a role that is assigned to a user and is permanently valid even after the user no longer uses the chat. In XEP-0045 (Multi-User Chat), affiliations such as an "owner" who opened the chat room, an "administrator" who controls and manages the chat room, a "member" who is a user aside from the owner and the administrator, an "outcast" who is a user that has been kicked from the chat room and is not allowed to reenter the chat room, and so on are defined.

Meanwhile, XEP-0071 (Xhtml-IM) is a protocol (communication protocol) defined with regards to the exchange of instant messages that include small-size text markup (tagged) employing HTML subsets. With this protocol, it is possible to set a message format that uses a narrow range of generally-used HTML elements, attributes, and style properties suitable for use in instant messaging.

The electronic conference system 1 according to the present embodiment is managed using an XMPP protocol (communication protocol) as described above, and particularly using a multi-user chat function (called an "MUC function" hereinafter) compliant with XEP-0045 (Multi-User Chat). This MUC function is provided by the display apparatus 10, as will be described later.

Meanwhile, the display apparatus 10 and information terminal apparatuses 20 in the electronic conference system 1 send and receive information based on a protocol that further extends XEP-0071 (XHTML-IM), which is an XMPP protocol (communication protocol). For this reason, it is also possible to send and receive information having extended attribute information, which will be described later.

Next, the specific configurations of the display apparatus 10 and information terminal apparatus 20 of the electronic conference system 1 according to the present embodiment will be described in detail with reference to the drawings.

Figure 3:
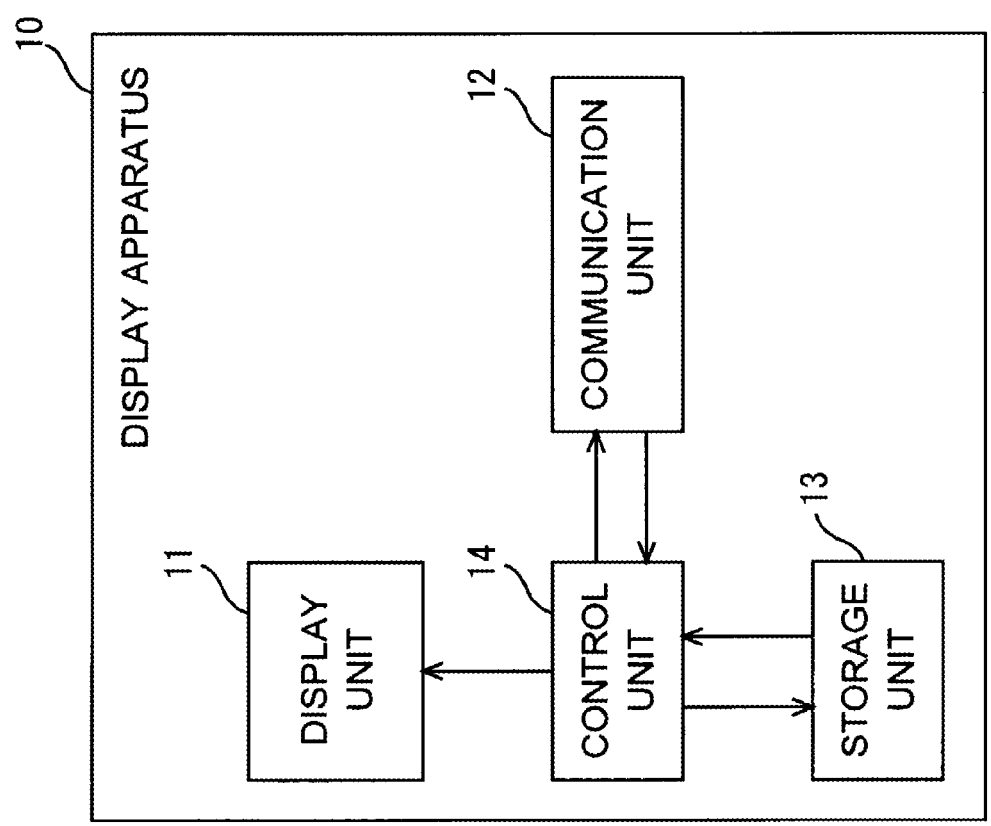
FIG. 3 is a block diagram illustrating the configuration of a display apparatus according to an embodiment of the present invention.

FIG. 3 is a block diagram illustrating the configuration of the display apparatus according to the present embodiment. The display apparatus 10 is a display apparatus that communicates with multiple information terminal apparatuses 20 in the electronic conference system 1 over a network, and is capable of communication based on XMPP. The display apparatus 10 includes: a display unit 11 that is capable of using the DOM (Document Object Model), which will be described later, as display information for displaying proceedings and so on in the electronic conference system 1 and that performs a display based on the display information; a communication unit 12 that sends and receives information to and from the information terminal apparatuses 20; a storage unit 13 that stores information, display information, and so on sent and received by the communication unit 12; and a control unit 14 that controls the display unit 11, the sending/receiving operations performed by the communication unit 12, the storage and readout of information performed by the storage unit 13, and so on. In addition, the storage unit 13 stores display information of an information service capable of being used by the respective information terminal apparatuses 20 of the electronic conference system 1. Furthermore, when necessary, the control unit 14 edits and reconfigures the display information, modifies information contained in the display information (data ID (ID information), access rights information, user information, and so on, which will be described later), creates documents written in HTML (Hyper Text Markup Language) from the display information as a whole, and so on.

Here, the DOM (Document Object Model) used by the display apparatus in the electronic conference system 1 according to the present embodiment will be described. DOM is an API (Application Program Interface) standardized for HTML and XML (Extensible Markup Language) and so on, and has been regulated by the W3C (World Wide Web Consortium). Using DOM makes it possible to dynamically access programs and scripts and handle content (text information, image information, audio information, and so on) and the layouts and styles used when displaying the content as objects, regardless of platform, language, or the like; furthermore, DOM functions as an interface for carrying out control using a script language such as JavaScript. In general, it can be said that webpages, XML pages, and so on displayed when using the Internet or the like are documents written in HTML, XML, and so on.

Figure 4:
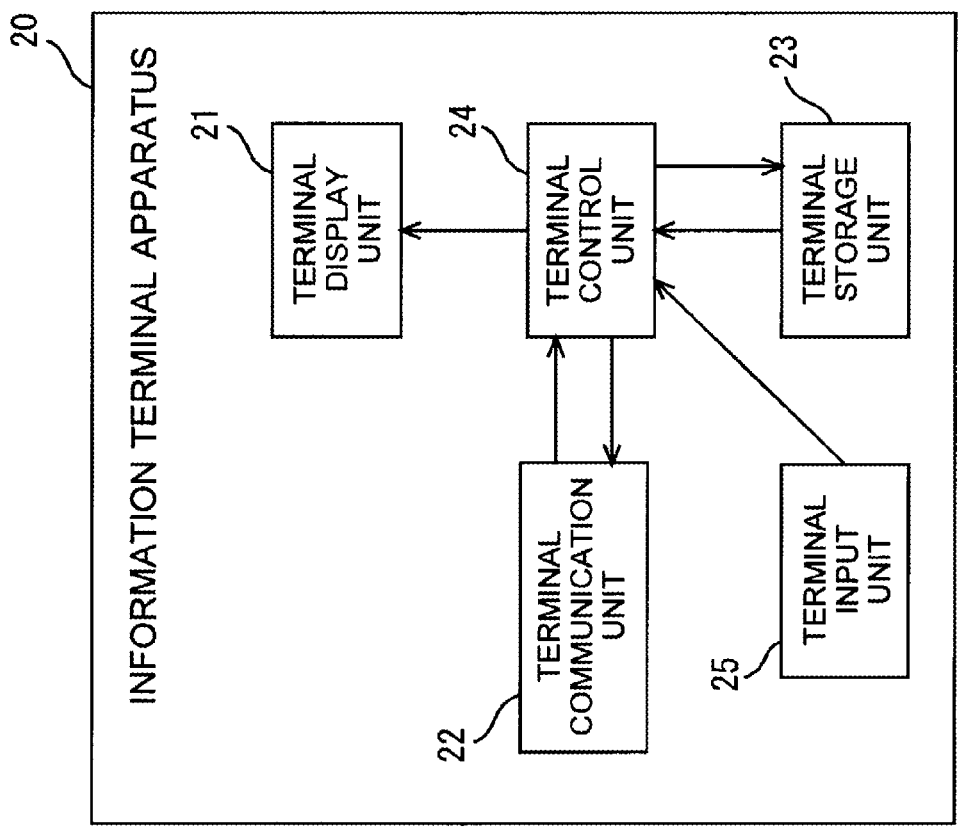
FIG. 4 is a block diagram illustrating the configuration of an information terminal apparatus according to an embodiment of the present invention.

Meanwhile, FIG. 4 is a block diagram illustrating the configuration of the information terminal apparatus according to the present embodiment. The information terminal apparatus 20 is an information terminal apparatus that communicates with the display apparatus 10 in the electronic conference system 1 over a network, and is capable of communication based on XMPP. The information terminal apparatus 20 includes: a terminal communication unit 22 that sends and receives information to and from the display apparatus 10; a terminal storage unit 23 that stores information sent and received by the terminal communication unit 22, display information for displaying display information provided by an information service in a display screen, and so on; a terminal control unit 24 that controls the sending/receiving operations performed by the terminal communication unit 22, information storage and readout operations performed by the terminal storage unit 23, and so on; and a terminal input unit 25 by which a user inputs information. In addition, when necessary, the terminal control unit 24 also edits and reconfigures the display information, creates and modifies meta-information contained in the display information (unique data ID (ID information), location information, and so on, which will be described later), and so on. Furthermore, the information terminal apparatus 20 may include a terminal display unit 21 that performs a display based on the display information received from the display apparatus 10 by the terminal communication unit 22. Although a mobile terminal apparatus such as a mobile telephone, a PDA, or the like can be given as an example of the information terminal apparatus 20, the information terminal apparatus 20 is not limited thereto, and any information terminal apparatus may be used as long as it has a communication function.

Meanwhile, a role indicating a temporary privilege level in an electronic conference being managed using the MUC function, such as "moderator" and "participant", is allocated to each information terminal apparatus 20. Hereinafter, in the virtual conference room (electronic conference system 1), an information terminal apparatus given the role of "moderator" will be referred to as a moderator terminal apparatus 201, whereas an information terminal apparatus given the role of "participant" will be referred to as a user terminal apparatus 202. The moderator terminal apparatus 201 is an information terminal apparatus that controls data to be displayed in the display unit of the display apparatus in the electronic conference system 1, and can set data ID (ID information) for identifying data to be displayed in the display unit of the display apparatus, access right that is set on a user-by-user basis for users that use the information terminal apparatuses 20 (that is, the moderator terminal apparatus 201 and the user terminal apparatuses 202) and that indicates whether or not to permit the generation and changing of data, and can set the users to serve as the owners of that data; the moderator terminal apparatus 201 thus advances and manages the proceedings in the electronic conference system 1.

Although the affiliations of each of the information terminal apparatuses 20 are not particularly discussed, in the electronic conference system 1 according to the present embodiment, the "moderator" has the affiliations of "owner" and "administrator", whereas the "participant" has the affiliation of "member". Meanwhile, the affiliations of "visitor" and "outcast" will not be discussed.

Figure 5:
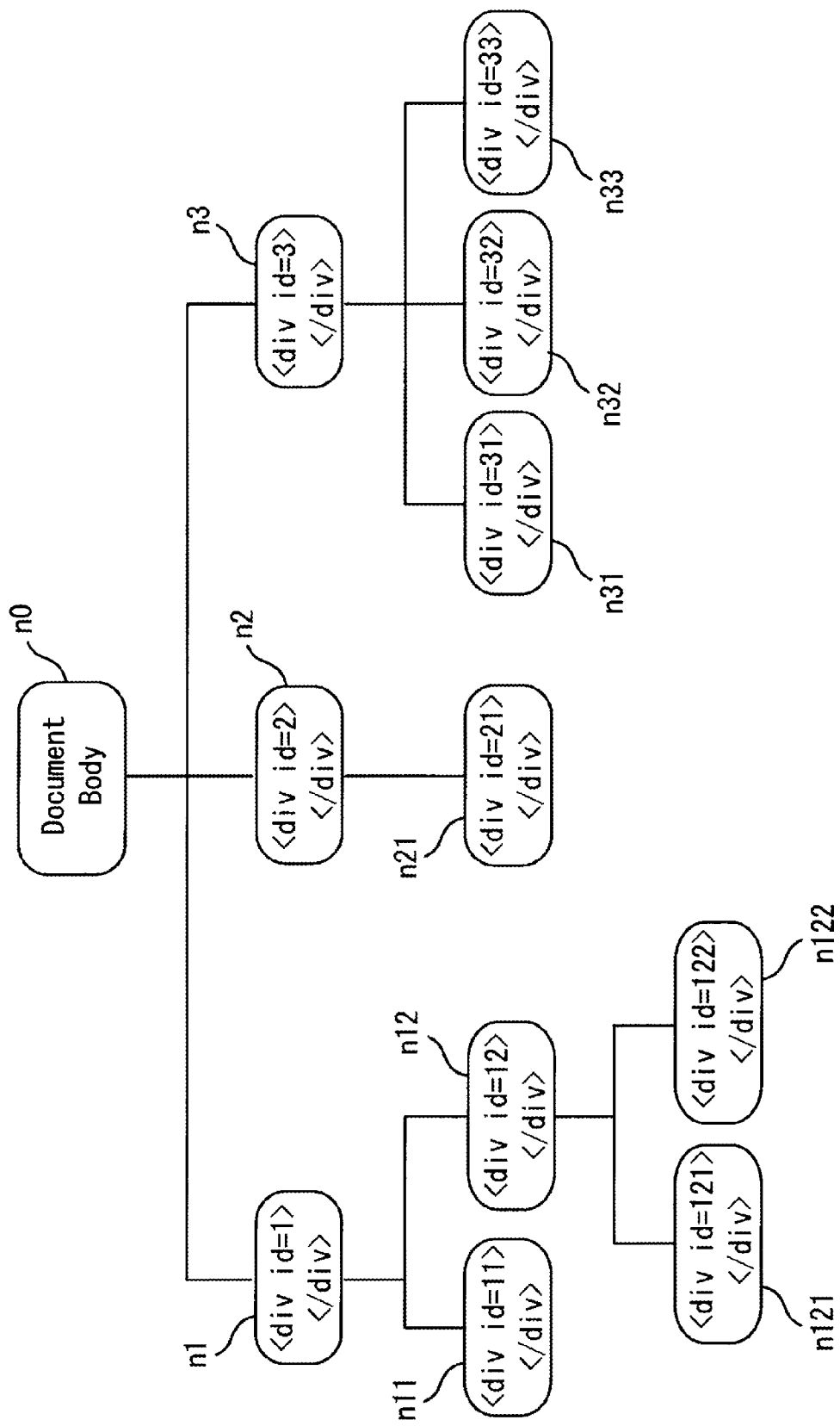
FIG. 5 is a structural diagram illustrating the structure of display information according to an embodiment of the present invention.

Next, the display information for displaying proceedings and so on in the electronic conference system 1 will be described. The display information is information that is structured so that multiple pieces of data have structural correlations. Although the structure thereof is not particularly limited, it can take on a tree structure. The individual pieces of information of which information structured in this manner is composed will be called "HTML fragment information". FIG. 5 is a structural diagram illustrating the structure of the display information according to an embodiment of the present invention. As illustrated in FIG. 5, the pieces of HTML fragment information in the display information have hierarchical correlations, with HTML fragment information n0 serving as the root. Here, in such a structure, HTML fragment information that is one level above a certain piece of HTML fragment information is referred to as "parent HTML fragment information", whereas HTML fragment information that is one level below a certain piece of HTML fragment information is referred to as "child HTML fragment information".

Figure 6:
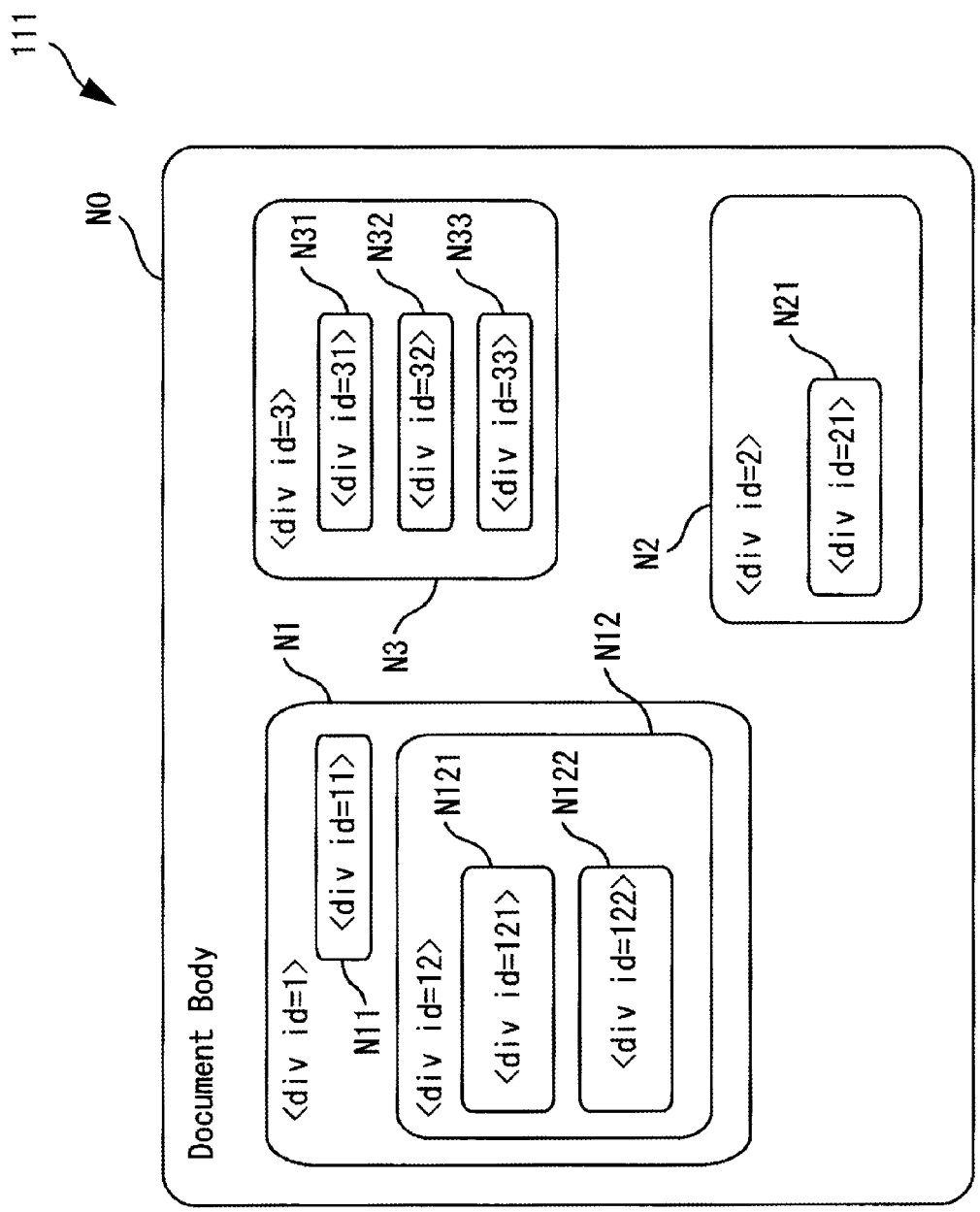
FIG. 6 is a diagram illustrating a display screen based on display information according to an embodiment of the present invention.
Figure 7:
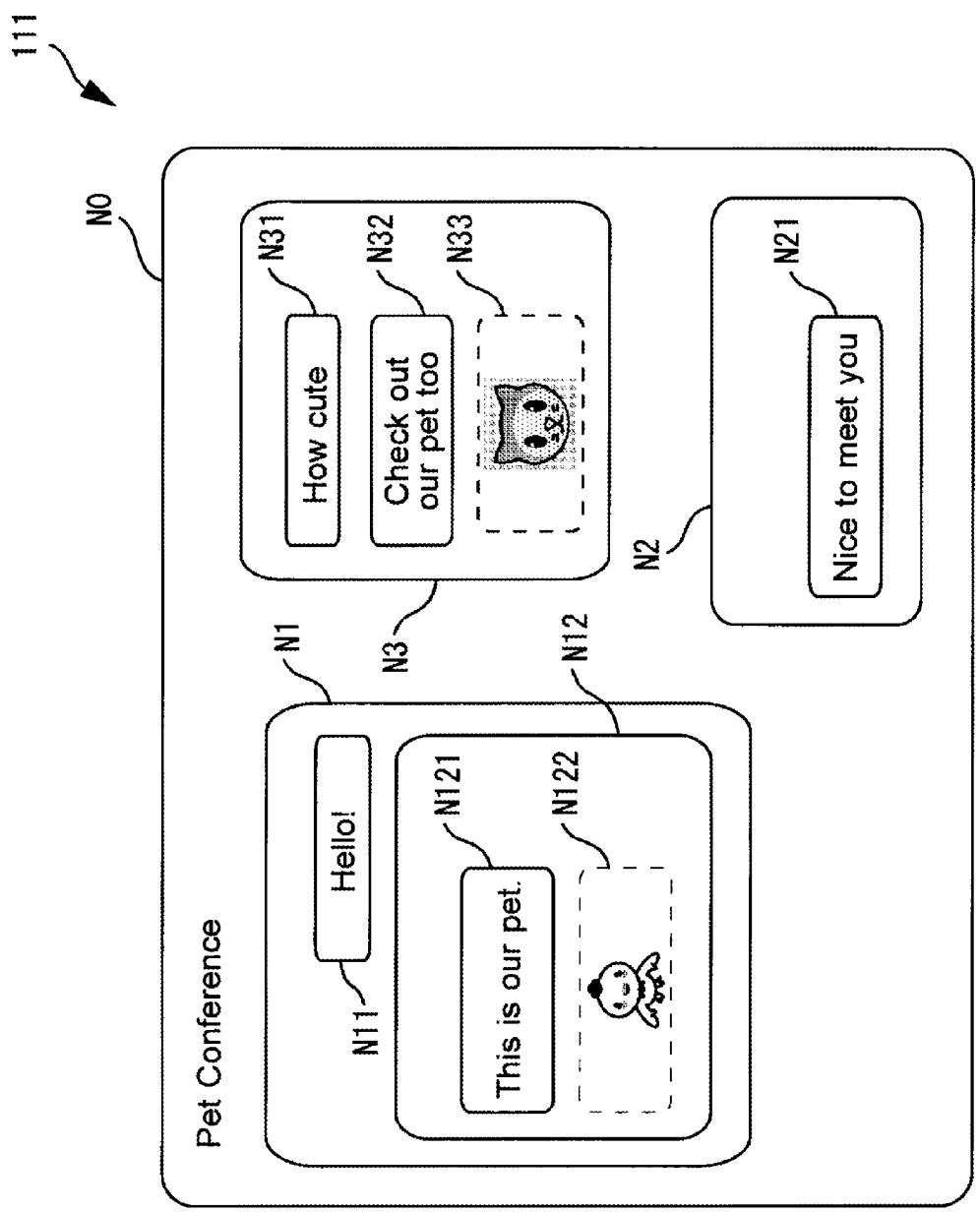
FIG. 7 is a diagram illustrating an example of an actual display screen based on display information according to an embodiment of the present invention.

Next, a display screen displayed in the display unit of the display apparatus based on the display information composed of multiple pieces of HTML fragment information will be described. FIG. 6 is a diagram illustrating a display screen based on the display information according to an embodiment of the present invention. FIG. 7, meanwhile, is a diagram illustrating an example of an actual display screen based on the display information according to an embodiment of the present invention. As illustrated in FIG. 7, each information display frame in a display screen 111 of the display unit 11 corresponds to a respective piece of HTML fragment information, and the information in the respective pieces of HTML fragment information (for example, text information, image information, video information, audio information, and so on) is displayed in the corresponding information display frame.

For example, in the display screen 111, the information in the HTML fragment information n0 is displayed within an information display frame N0, whereas the information in HTML fragment information n1, n2, and n3, which are pieces of HTML fragment information that are one level below the HTML fragment information n0 (that is, are child HTML fragment information), are respectively displayed in information display frames N1, N2, and N3, which are disposed within the information display frame N0. Meanwhile, the information in HTML fragment information n11 and n12, which are child HTML fragment information of the HTML fragment information n1, are respectively displayed in information display frames N11 and N12, which are disposed within the information display frame N1; the information in HTML fragment information n21, which is child HTML fragment information of the HTML fragment information n2, is displayed in an information display frame N21, which is disposed within the information display frame N2; and the information in HTML fragment information n31, n32, and n33, which are child HTML fragment information of the HTML fragment information n3, are respectively displayed in information display frames N31, N32, and N33, which are disposed within the information display frame N3. Furthermore, the information in HTML fragment information n121 and n122, which are child HTML fragment information of the HTML fragment information n12, are respectively displayed in information display frames N121 and N122, which are disposed within the information display frame N12. In this manner, with the display screen 111 of the display unit 11 that is based on the display information, information in the child HTML fragment information is displayed within an information display frame disposed within an information display frame of the parent HTML fragment information.

Meanwhile, each piece of HTML fragment information of which the display information is composed has data that is to be displayed in the display unit 11 of the display apparatus 10. Although text information, image information, audio information, video information, and so on can be given as examples of the data in the pieces of HTML fragment information, as long as the data is expressed as HTML that is suited for communication based on XMPP, all formats of data that can be expressed by that HTML (text data, image data, audio data, video data, and so on) can be received, and the combinations thereof are not limited.

Meanwhile, each piece of HTML fragment information has meta-information that is information regarding data in the HTML fragment information, such as a unique data ID (ID information) for identifying the data in the HTML fragment information (in other words, the data to be displayed in the display unit 11 of the display apparatus 10), user information indicating the user that is the owner of the data in the HTML fragment information, access rights information indicating access rights to the HTML fragment information set on a user-by-user basis for the users that use the information terminal apparatuses 20 (the moderator terminal apparatus 201 and the user terminal apparatus 202) (that is, whether or not to permit the generation and changing of the data in the HTML fragment information), and so on.

Each piece of HTML fragment information can be accessed only by a user who has been permitted by the access rights information indicating the access rights to the data in the HTML fragment information set on a user-by-user basis for the users that use the information terminal apparatuses (in other words, whether or not to permit the generation and changing of the data). A user that has been given access rights through the access rights information can access that HTML fragment information, can view the data and meta-information of the HTML fragment information, and change and modify the content thereof. Note that access rights to parent HTML fragment information also extend to the child HTML fragment information thereof. In other words, users that have not been given access rights using access rights information for parent HTML fragment information also do not have access rights to the child HTML fragment information thereof. On the other hand, users that have been given access rights using access rights information for parent HTML fragment information also have access rights to the child HTML fragment information thereof.

In addition, each piece of HTML fragment information may have, as meta-information, location information indicating the display location of the data in the HTML fragment information (in other words, the data to be displayed in the display unit 11 of the display apparatus 10), generation time and date information indicating the generation time and date of the information in the HTML fragment information, expiration date information indicating the expiration date of information in the HTML fragment information, update time and date information indicating the latest time and date at which the content of the information in the HTML fragment information was changed, and so on.

FIG. 8 is a diagram illustrating an example of HTML fragment information expressed as an HTML document according to an embodiment of the present invention. In FIG. 8, the following are included as meta-information of the HTML fragment information according to the present embodiment: location information indicating the display location of the data in the HTML fragment information to be displayed in the display unit 11 of the display apparatus 10; a unique data ID (ID information) for identifying the data in the HTML fragment information; generation time and date information indicating the generation time and date of the HTML fragment information; update time and date information indicating the time and date at which the content of the HTML fragment information was updated; user information indicating the user that is the owner of the data in the HTML fragment information; access rights information indicating access rights to the HTML fragment information set on a user-by-user basis for the users who use the information terminal apparatuses 20 (the moderator terminal apparatus 201 and the user terminal apparatuses 202) (that is, whether or not to permit the generation and changing of the data in the HTML fragment information); and so on.

Here, the display location of the data indicated by the location information may be specified by absolute coordinates within the information display frame of the parent HTML fragment information, or may be arranged and displayed in the information display frame of the parent HTML fragment information in accordance with the document flow thereof. For example, in the case where the HTML fragment information is enclosed by <div> tags, the display location may be specified by absolute coordinates within the information display frame of the parent HTML fragment information, whereas in the case where the HTML fragment information is enclosed by <par> tags, the content may be arranged and displayed in the information display frame of the parent HTML fragment information in accordance with the document flow thereof.

In addition, the user information in the meta-information of each piece of HTML fragment information may indicate the owner of that HTML fragment information, and the user indicated by that user information may be capable of generating and deleting the child HTML fragment information of that HTML fragment information.

Figure 9:
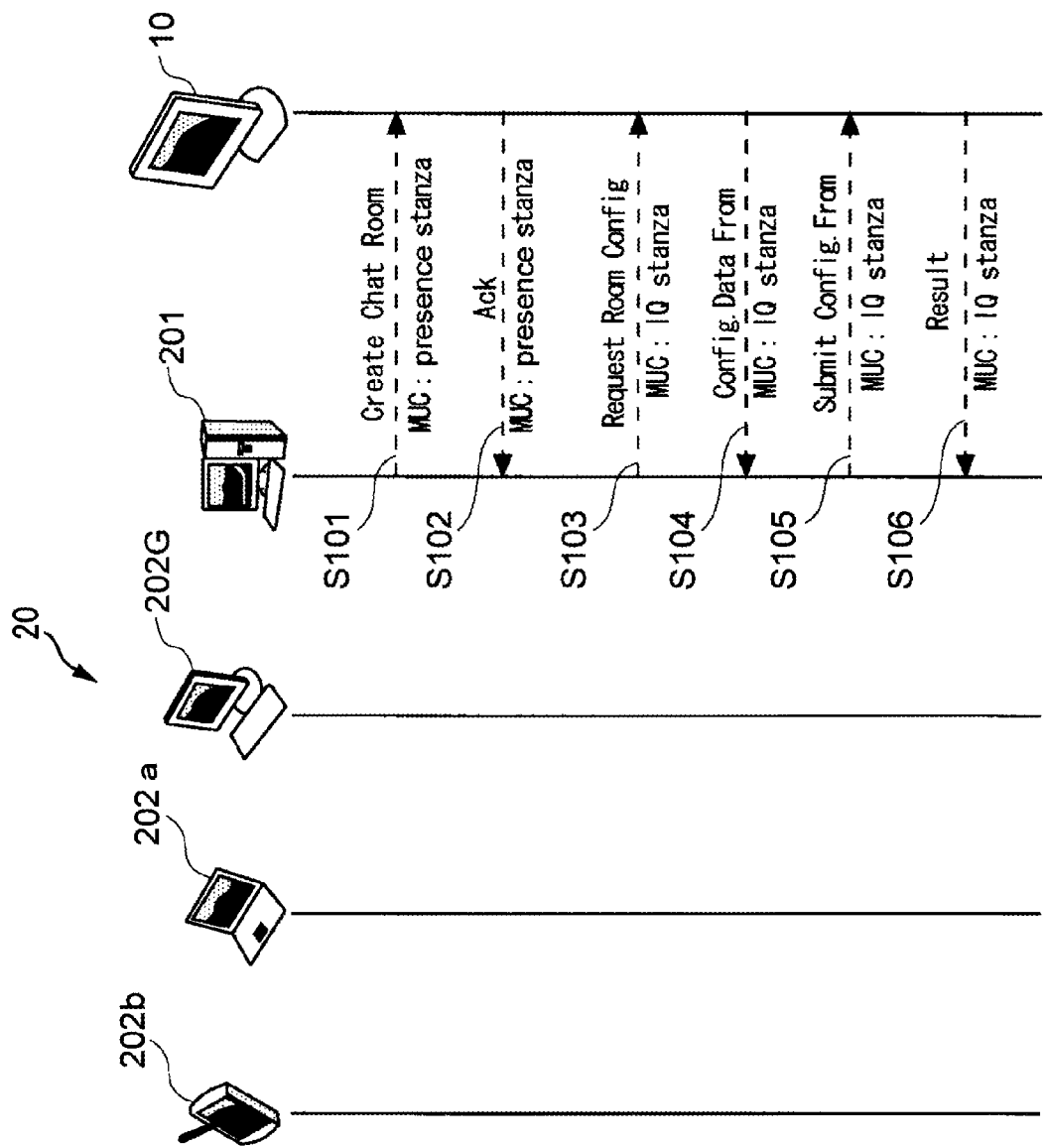
FIG. 9 is a sequence diagram illustrating a procedure by which a display apparatus in an electronic conference system establishes a virtual conference room, according to an embodiment of the present invention.

Next, specific operations of the electronic conference system 1 according to the present embodiment will be described. FIG. 9 is a sequence diagram illustrating a procedure by which the display apparatus in the electronic conference system according to an embodiment of the present invention establishes a virtual conference room. Here, the display apparatus 10 establishes the electronic conference system 1 using the MUC function with the moderator terminal apparatus 201.

In step S101, the moderator terminal apparatus 201 of the electronic conference system 1 sends a request to establish a virtual conference room (chat room) to the display apparatus 10.

In step S102, the display apparatus 10 issues a notification that the request has been successfully received from the moderator terminal apparatus 201.

In step S103, the moderator terminal apparatus 201 notifies the display apparatus 10 of the creation of setting information for establishing the virtual conference room.

In step S104, the display apparatus 10 sends, to the moderator terminal apparatus 201, data form information for creating the setting information.

In step S105, the moderator terminal apparatus 201 creates the setting information for establishing the virtual conference room based on the data form information received from the display apparatus 10, and sends the created setting information to the display apparatus 10.

In step S106, the display apparatus 10 issues a notification to the moderator terminal apparatus 201 that the setting information has been successfully received.

In this manner, a virtual conference room in which multiple users who use information terminal apparatuses 20 can participate is established through the establishment, between the display apparatus 10 and the moderator terminal apparatus 201, of the electronic conference system 1.

Figure 10:
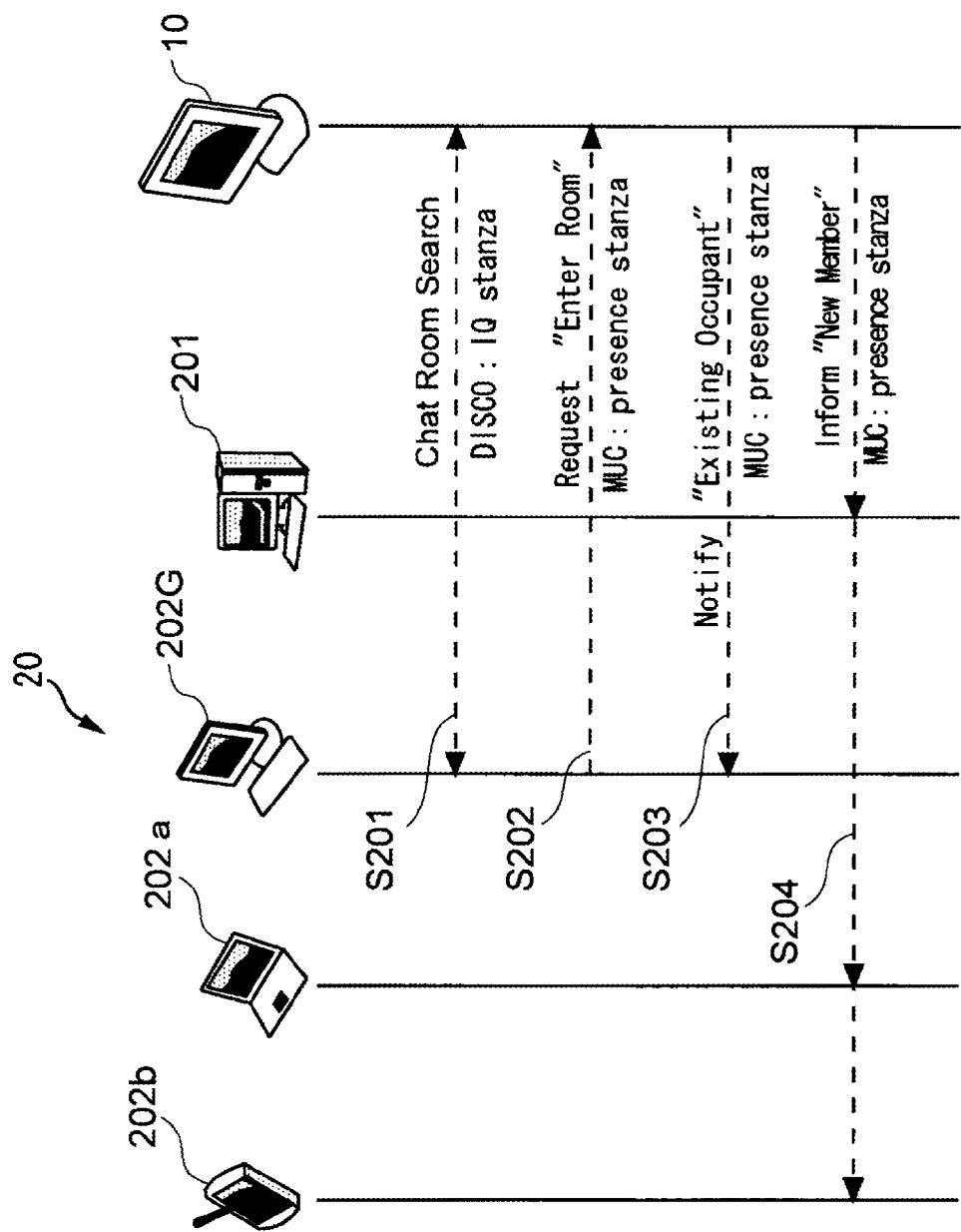
FIG. 10 is a sequence diagram illustrating a procedure for an information terminal apparatus to participate in an electronic conference system, according to an embodiment of the present invention.

Next, a procedure by which a user terminal apparatus 202 participates in the established virtual conference room (electronic conference system 1) will be described. FIG. 10 is a sequence diagram illustrating a procedure for the information terminal apparatus to participate in the electronic conference system, according to an embodiment of the present invention. Here, a procedure by which a user terminal apparatus 202G, for example, participates in the virtual conference room (that is, the electronic conference system 1) will be described. Note that hereinafter, the user terminal apparatus 202G will be referred to as a "user terminal apparatus G".

In step S201, the user terminal apparatus G (202G) searches for a virtual conference room (electronic conference system 1) established by the display apparatus 10 using XEP-0030 (Service Discovery) (called "DISCO" hereinafter), which is an XMPP protocol (communication protocol). Through this, the user terminal apparatus G (202G) can discover a virtual conference room (electronic conference system 1) established by the display apparatus 10.

In step S202, the user terminal apparatus G (202G) makes a request, to the display apparatus 10, to enter the virtual conference room (electronic conference system 1).

In step S203, the display apparatus 10 sends a notification to the user terminal apparatus G (202G) indicating that the user terminal apparatus G (202G) is permitted to enter the room.

Then, in step S204, the display apparatus 10 sends a notification to the other information terminal apparatuses that are already in the virtual conference room (electronic conference system 1) (that is, the moderator terminal apparatus 201 and the other user terminal apparatuses 202a and 202b) indicating that a new user has entered the room.

Through the aforementioned steps S201 to 204, the user terminal apparatus G (202G) can enter the virtual conference room (electronic conference system 1), and can carry out communication based on XMPP with the display apparatus 10 and the other information terminal apparatuses (that is, the moderator terminal apparatus 201 and the other user terminal apparatuses 202a and 202b).

Figure 11:
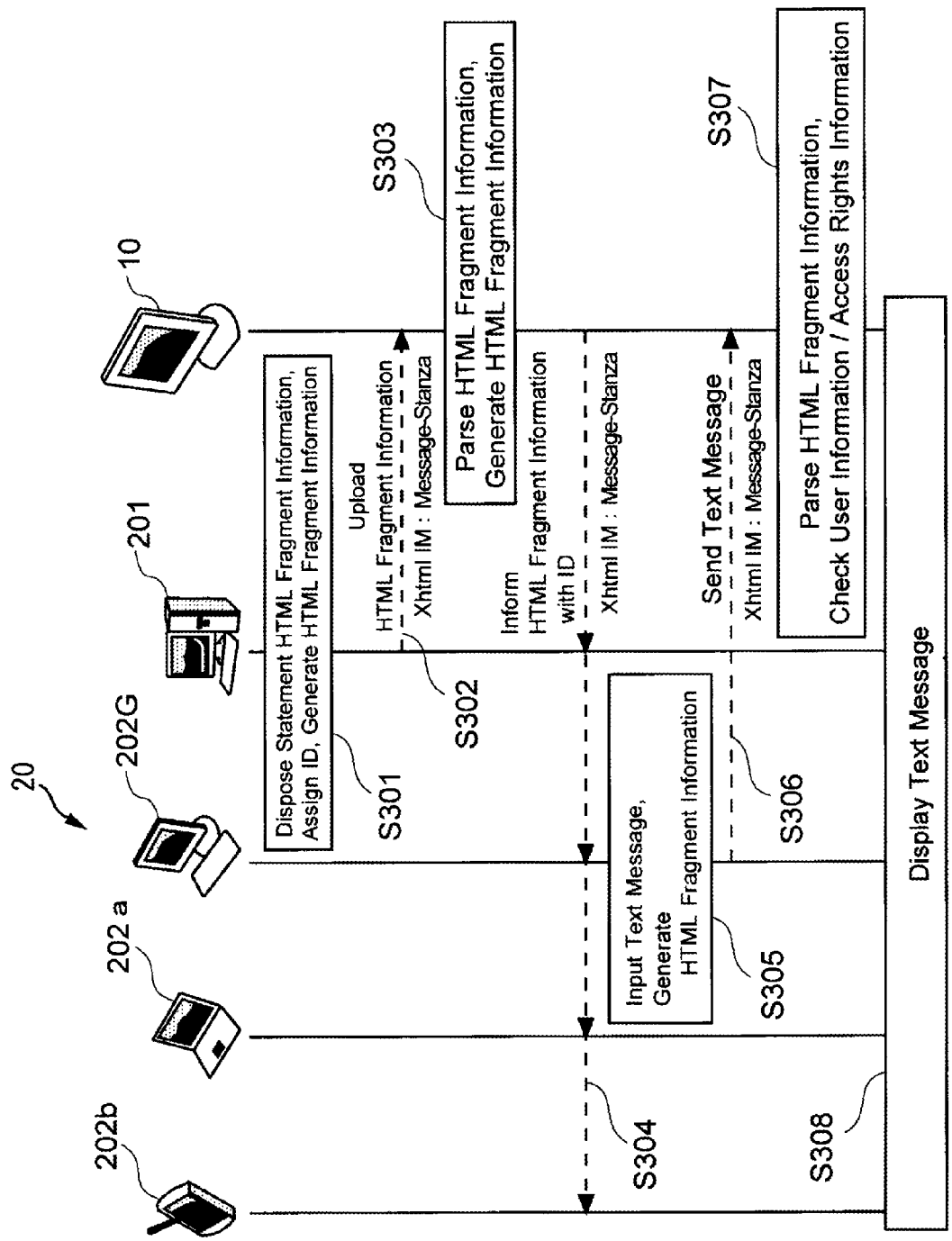
FIG. 11 is a sequence diagram illustrating a procedure by which information provided by an information terminal apparatus is displayed in a display screen, according to an embodiment of the present invention.

Next, a procedure spanning up until the data presented in the virtual conference room (electronic conference system 1) is displayed in the display apparatus 10 will be described. Here, a procedure in which information (statements or the like) presented by the user terminal apparatus G (202G) to the virtual conference room is displayed in the display apparatus 10 will be described as an example. FIG. 11 is a sequence diagram illustrating a procedure by which information provided by the information terminal apparatus is displayed in a display unit, according to an embodiment of the present invention. Note that it is first assumed that the user of the user terminal apparatus G (202G) is in a state, for example, where she/he is to make a statement, or that statements can be made directly due to the user of the moderator terminal apparatus 201 being offline or the like.

In step 301, the moderator terminal apparatus 201 creates statement HTML fragment information necessary for the user terminal apparatus G (202G) to make a statement in the virtual conference room (electronic conference system 1). Here, by embedding the statement HTML fragment information created by the moderator terminal apparatus 201 in the display information, the information display frame for displaying the statement (data) presented by the speaker (in this case, the user terminal apparatus G (202G)) is set to the display screen 111 of the display unit 11 in the display apparatus 10.

Meanwhile, the moderator terminal apparatus 201 creates, using the terminal control unit 24, a unique data ID (ID information), for identifying the data in the statement HTML fragment information, that does not overlap with data ID (ID information) that correspond to the data of other HTML fragment information, and furthermore creates meta-information for the statement HTML fragment information, such as user information indicating the user that is the owner of the data stored in the statement HTML fragment information, access rights information indicating access rights for the statement HTML fragment information set on a user-by-user basis for the users that use the information terminal apparatuses 20 (moderator terminal apparatus 201 and user terminal apparatuses 202) (that is, whether or not the generation and changing of data stored in the statement HTML fragment information is permitted), and so on. Then, a document written in HTML from the statement HTML fragment information that has the created meta-information is created.

Furthermore, the moderator terminal apparatus 201 may create location information indicating the display location of the data to be displayed in the display unit 11 of the display apparatus 10 and may then send the data ID (ID information), the user information, the access rights information, and the location information indicating the display location of the data to be displayed in the display unit 11 of the display apparatus 10 to the display apparatus 10. By doing so, the user of the moderator terminal apparatus 201 can control the display location of the various pieces of data to be displayed in the display unit 11 of the display apparatus 10 with certainty and with ease.

In step S302, the moderator terminal apparatus 201 sends the statement HTML fragment information to the display apparatus 10.

In step S303, the display apparatus 10 parses the statement HTML fragment information, and if the syntax is correct, presents an information display frame that enables the speaker (in this case, the user terminal apparatus G (202G)) to make a statement.

In step S304, the display apparatus 10 furthermore sends the statement HTML fragment information including the data ID (ID information) created in S301 to the other information terminal apparatuses (the moderator terminal apparatus 201 and the user terminal apparatuses 202, including the user terminal apparatus G (202G)), communicating that an information display frame enabling the speaker to make a statement (here, the information display frame for the user terminal apparatus G (202G)) has been provided in the display screen 111 of the display unit 11.

In step S305, the user terminal apparatus G (202G) inputs a statement (data) to be presented to the virtual conference room (electronic conference system 1) using the terminal input unit 25. Here, the data inputted using the terminal input unit 25 is data that is stored in the statement HTML fragment information specified by the data ID (ID information). The user terminal apparatus G (202G) then edits the statement HTML fragment information so as to add the data inputted using the terminal input unit 25 to the statement HTML fragment information. Here, as long as the data is expressed as HTML that is suited for communication based on XMPP, all formats of data that can be expressed by such HTML can be used as the data inputted using the terminal input unit 25 of the present embodiment, such as audio data, image data, video data, and so on, in addition to text data.

In step S306, the user terminal apparatus G (202G) sends the edited statement HTML fragment information to the display apparatus 10.

In step S307, the display apparatus 10 parses the statement HTML fragment information received from the user terminal apparatus G (202G), and edits the display information based on the received statement HTML fragment information. In other words, the display apparatus 10 determines whether or not the user to which access rights to the statement HTML fragment information indicated by the access rights information have been given matches the user indicated by the user information; in the case where the users match, the user who is using the user terminal apparatus G (202G) is permitted to access the statement HTML fragment information (in other words, to generate and change the data of the statement HTML fragment information), and thus the control unit 14 of the display apparatus 10 edits the display information based on the received statement HTML fragment information.

Then, in step S308, the display apparatus 10 displays the proceedings and the like carried out in the virtual conference room in the display unit 11, based on the edited display information. Furthermore, at this time, the data identified by the data ID (ID information) (in other words, the data inputted in step S305 using the terminal input unit 25 of the user terminal apparatus G (202G)) is displayed in the display unit 11 of the display apparatus 10 based on the user information and the access rights information.

Note that in the case where in S301 the moderator terminal apparatus 201 has created location information indicating the display location of the data to be displayed in the display unit of the display apparatus and has sent the data ID (ID information), the user information, the access rights information, and the location information to the display apparatus as meta-information of the statement HTML fragment information, the display apparatus 10 displays the data identified by the data ID (ID information) in the display unit 11 based on the access rights information, the user information, and the location information. In other words, the display apparatus 10 displays the data identified by the data ID (ID information) in the display unit 11 at the display location indicated by the location information. By doing so, the user of the moderator terminal apparatus 201 can control the display location of the various pieces of data to be displayed in the display unit 11 of the display apparatus 10 with certainty and with ease.

In this manner, with the electronic conference system 1 according to the present embodiment, the moderator terminal apparatus 201 that controls the data to be displayed in the display unit 11 of the display apparatus 10 sends, to the display apparatus 10, a data ID (ID information) for identifying the data to be displayed in the display unit 11, user information indicating the user that is the owner of that data, and access rights information that is set on a user-by-user basis for the users and that indicates whether or not the generation and changing of data is permitted. Then, the display apparatus 10 determines whether or not to display the data identified by the data ID (ID information) based on the received user information and access rights information, and displays the data in the display unit 11. Accordingly, not only can the data be controlled based on data ID (ID information), but each piece of data to be displayed in the display unit 11 of the display apparatus 10 can also be controlled in accordance with access rights to that data set on a user-by-user basis for the multiple users that use the information terminal apparatuses 20 (in other words, whether or not the generation and changing of data is permitted). It is thus possible to enable smooth communication that is compliant with the access rights among the respective multiple users.

In addition, the user terminal apparatus 202 sends the data to be displayed in the display unit 11, the data ID (ID information) for identifying the data, and the user information indicating the user that is the owner of that data to the display apparatus 10, and the display apparatus 10 then displays the data identified by the data ID (ID information) in the display unit 11 based on the user information and the access rights information; therefore, each piece of data sent from a user terminal apparatus 202 that is to be displayed in the display unit 11 is controlled based on data ID (ID information), and that data is controlled in accordance with access rights to the data set on a user-by-user basis for the multiple users that use the information terminal apparatuses 20 (in other words, whether or not the generation and changing of data is permitted). Accordingly, smooth communication compliant with the access rights among the respective multiple users can be carried out.

Furthermore, when the user permitted to generate and change the data as indicated by the access rights information matches the user indicated by the user information, the display apparatus 10 displays the data identified by the data ID (ID information) in the display unit 11; therefore, that data can be displayed in the display unit 11 only in the case where the user that is the owner of the data identified by the data ID (ID information) matches the user that has the access rights to that data (in other words, whether or not the generation and changing of data is permitted). Accordingly, it is possible to enable smooth communication compliant with the access rights among the respective multiple users.

The present invention has been described in the foregoing based on an embodiment. The foregoing embodiment is exemplary, and it is to be understood by those skilled in the art that the many variations on the respective constituent elements and combinations of processes that are possible also fall within the scope of the present invention.

For example, although the foregoing embodiment described a configuration in which the display apparatus 10 and multiple information terminal apparatuses including one or more information terminal apparatuses 20 carry out communication based on XMPP, the present invention is not intended to be limited thereto. The communication carried out may be based on a protocol (communication protocol) that resembles XMPP.

Furthermore, the extended display information sent and received between the display apparatus 10 and the information terminal apparatuses 20 in the foregoing embodiment may be HTML files having extended meta-information. Here, an "HTML file having extended meta-information" refers to a file having data of a format that can be expressed by HTML suited to communication based on XMPP (text data, image data, audio data, video data, and so on) and meta-information that is information related to that data (attribute information), and attribute information corresponding to messaging based on XMPP, such as a data ID (ID information) and location information, is included in that meta-information. In this manner, using attribute information (a data ID (ID information), location information) corresponding to messaging based on XMPP as meta-information is called "extending". By employing such a configuration, as long as the data is expressed as HTML that is suited for communication based on XMPP, all formats of data that can be expressed by that HTML (text data, image data, audio data, video data, and so on) can be received, and the combinations thereof are not limited.

In order to achieve the stated object, a communication method according to the present invention can be implemented as a communication method in which multiple users participate in communication between a display apparatus and multiple information terminal apparatuses over a network, where the multiple information terminal apparatuses include a moderator terminal apparatus that controls data to be displayed in a display unit of the display apparatus; the moderator terminal apparatus sends, to the display apparatus, ID information for identifying the data to be displayed in the display unit of the display apparatus, user information indicating a user that is the owner of the data, and access rights information that is set on a user-by-user basis for users that use the multiple information terminal apparatuses and that indicates whether or not generation and changing of the data is permitted; and the display apparatus displays the data identified by the ID information in the display unit based on the user information and the access rights information.

According to the communication method configured as described above, a communication method in which multiple users participate is implemented; a moderator terminal apparatus that controls the data to be displayed in the display unit of the display apparatus sends, to the display apparatus, the ID information for identifying the data to be displayed in the display unit, the user information indicating the user that is the owner of that data, and the access rights information that is set on a user-by-user basis and that indicates whether or not to permit the generation and changing of the data. Then, the display apparatus determines whether or not to display the data identified by the ID information based on the received user information and access rights information, and displays the data in the display unit. Accordingly, not only can the data be controlled based on the ID information, but each piece of data to be displayed in the display unit of the display apparatus can also be controlled in accordance with access rights to that data set on a use-by-user basis for the multiple users that use the information terminal apparatuses (in other words, whether or not the generation and changing of data is permitted); it is thus possible to enable smooth communication that is compliant with the access rights among the respective multiple users.

In the communication method configured as described above, the configuration may be such that the multiple information terminal apparatuses include the moderator terminal apparatus and a user terminal apparatus that sends the data to the display apparatus; the moderator terminal apparatus sends, to the display apparatus, ID information for identifying the data sent from the user terminal apparatus and to be displayed in the display unit of the display apparatus, user information indicating a user that is the owner of the data, and access rights information that is set on a user-by-user basis for users that use the multiple information terminal apparatuses and that indicates whether or not generation and changing of the data is permitted; the user terminal apparatus sends, to the display apparatus, the data to be displayed in the display unit, the ID information, and the user information; and the display apparatus displays the data identified by the ID information in the display unit based on the user information and the access rights information.

According to such a configuration, not only can the pieces of data sent from the user terminal apparatus and to be displayed in the display unit be controlled based on the ID information, but that data can also be controlled in accordance with access rights to that data set on a user-by-user basis for the multiple users that use the information terminal apparatuses (in other words, whether or not the generation and changing of data is permitted). It is thus possible to enable smooth communication that is compliant with the access rights among the respective multiple users.

Here, the display apparatus may display the data identified by the ID information in the display unit when a user permitted to generate and change the data as indicated in the access rights information matches a user indicated in the user information. Through such a configuration, the data can be displayed in the display unit only in the case where the user that is the owner of the data identified by the ID information matches the user that has the access rights to that data (in other words, whether or not the generation and changing of the data is permitted). Accordingly, it is possible to enable smooth communication compliant with the access rights among the respective multiple users.

In the communication method configured as described above, the configuration may be such that the moderator terminal apparatus sends, to the display apparatus, the ID information, the user information, the access rights information, and location information indicating a display location of the data to be displayed in the display unit of the display apparatus; and the display apparatus displays the data identified by the ID information in the display unit based on the access rights information, the user information, and the location information.

Here, the display apparatus may display the data identified by the ID information in a display location in the display unit indicated by the location information. Through such a configuration, the user of the moderator terminal apparatus can control the display location of the various pieces of data to be displayed in the display unit of the display apparatus with certainty and with ease.

Furthermore, the communication method configured as described above may be a communication method employed in an electronic conference in which multiple users participate. Through such a configuration, not only can each statement (data) presented in the virtual conference room (that is, the electronic conference system) be controlled with certainty and with ease based on the ID information, but it is also possible to control the statements (data) presented in the virtual conference room in accordance with access rights set for each of multiple participants (users) participating in the virtual conference room (in other words, whether or not to permit the presentation and editing of statements (data)); accordingly, it is possible to enable the multiple users participating in the virtual conference room to communicate smoothly in accordance with their respective access rights.

In the communication method configured as described above, the configuration may be such that the display apparatus and the multiple information terminal apparatuses carry out communication based on XMPP (Extensible Messaging and Presence Protocol). Note that XMPP is an XML-based protocol (communication protocol) whose regulation/standardization are being developed by the XSF (XMPP Standards Foundation) that branched off from the XMPP workgroup of the IETF (Internet Engineering Task Force); XMPP dynamically controls a wide range of applications including instant messaging, presence (that is, what sort of status a partner is in), multi-user chat, audio and video telephone, task collaboration, content syndication, general routing of XML data, and so on, and is realized as a multiple-extension protocol (XEP: XMPP Extension Protocol) standardized in accordance with those respective purposes in order to carry out real-time communication using a communication system such as the Internet.

Through such a configuration, not only can messaging (information exchange) be carried out in real-time between the display apparatus and the multiple information terminal apparatuses (moderator terminal apparatus and user terminal apparatus), but the data exchanged through XMPP-based messaging and the data to be displayed in the display unit of the display apparatus can be associated with each other through the ID information with ease and with certainty.

In the communication method configured as described above, the configuration may be such that information sent and received between the display apparatus and the multiple information terminal apparatuses is an HTML file having extended meta-information. Here, an "HTML file having extended meta-information" has data of a format that can be expressed by HTML (Hyper Text Markup Language) suited to communication based on XMPP (text data, image data, audio data, video data, and so on). Note that the file may also have meta-information that is information regarding that data (attribute information). Attribute information corresponding to XMPP-based messaging, such as ID information, access rights information, user information, and so on, may be included as meta-information. Here, in this manner, using attribute information (ID information, access rights information, user information) corresponding to messaging based on XMPP as meta-information is called "extending".

Through such a configuration, as long as the data is expressed as HTML that is suited for communication based on XMPP, all formats of data that can be expressed by that HTML (text data, image data, audio data, video data, and so on) can be sent and received between the display apparatus and the multiple information terminal apparatuses, and the combinations thereof are not limited.

In the communication method configured as described above, the configuration may be such that the information sent and received between the display apparatus and the multiple information terminal apparatuses is fragment information that configures display information for carrying out a display in the display unit of the display apparatus. Through such a configuration, when, for example, the multiple information terminal apparatuses (moderator terminal apparatus and user terminal apparatus) attempt to change part of the information in the display information for carrying out the display in the display unit of the display apparatus, as long as the fragment information that includes the changed information is sent, the display apparatus can modify the display information for carrying out the display in the display unit based on the received fragment information. In other words, it is not necessary to send the entirety of the display information. Accordingly, it is possible to reduce the size of the information sent from the multiple information terminal apparatuses (moderator terminal apparatus and user terminal apparatus) to the display apparatus; this makes it possible to reduce the amount of time necessary for communication, and makes it possible to significantly reduce the load placed on the communication path between the display apparatus and the multiple information terminal apparatuses (moderator terminal apparatus and user terminal apparatus). As a result, the multiple users participating in the communication can carry out communication in a more convenient manner.

Furthermore, in order to achieve the stated object, a display apparatus according to the present invention can be implemented as a display apparatus that includes: a display unit; and a communication unit that communicates with multiple information terminal apparatuses over a network, where the multiple information terminal apparatuses include a moderator terminal apparatus that controls data to be displayed in the display unit and a user terminal apparatus that sends the data; the communication unit receives, from the moderator terminal apparatus, ID information for identifying the data sent from the user terminal apparatus and to be displayed in the display unit, user information indicating the owner of the data, and access rights information that is set on a user-by-user basis for users that use the multiple information terminal apparatuses and that indicates whether or not generation and changing of the data is permitted, and receives, from the user terminal apparatus, the data to be displayed in the display unit, the ID information, and the user information indicating the owner of the data; and the display unit displays the data identified by the ID information based on the user information and the access rights information.

According to the display apparatus configured as described above, a moderator terminal apparatus that controls the data to be displayed in the display unit sends, to the display apparatus, the ID information for identifying the data to be displayed in the display unit, the user information indicating the user that is the owner of that data, and access rights information that is set on a user-by-user basis and that indicates whether or not to permit the generation and changing of the data. Then, the display apparatus determines whether or not to display the data identified by the ID information based on the received user information and access rights information, and displays the data in the display unit. Accordingly, not only can each piece of data to be displayed in the display unit be controlled based on the ID information, but each piece of data to be displayed in the display apparatus can also be controlled in accordance with access rights set on a user-by-user basis for the multiple users that use the information terminal apparatuses (in other words, whether or not the generation and changing of data is permitted). It is thus possible to enable smooth communication that is compliant with the access rights for each of the multiple users that are using the information terminal apparatuses.

Meanwhile, in the display apparatus configured as described above, the display unit may display the data identified by the ID information in the display unit when a user permitted to generate and change the data as indicated in the access rights information matches a user indicated in the user information.

Through such a configuration, the data can be displayed in the display unit only in the case where the user that is the owner of the data identified by the ID information matches the user that has the access rights set on a user-by-user basis for the multiple users that use the multiple information terminal apparatuses (moderator terminal apparatus and user terminal apparatus) (in other words, whether or not the generation and changing of the data is permitted). Accordingly, it is possible to enable smooth communication in accordance with the access rights for each of the multiple users that are using the multiple information terminal apparatuses (moderator terminal apparatus and user terminal apparatus).

Furthermore, in the display apparatus configured as described above, the communication unit may receive, from the moderator terminal apparatus, the ID information, the user information, the access rights information, and location information indicating a display location of the data to be displayed in the display unit; and the display unit may display the data identified by the ID information based on the access rights information, the user information, and the location information.

Here, the display unit displays the data in the display location indicated by the location information. Through such a configuration, the display locations of the pieces of data to be displayed in the display unit are appropriately controlled by the user that uses the moderator terminal apparatus. Accordingly, it is possible to enable smooth communication for the multiple users that use the information terminal apparatuses under the control of the user that uses the moderator terminal apparatus.

Furthermore, in the display apparatus configured as described above, the communication unit may carry out communication with the moderator terminal apparatus and the user terminal apparatus based on XMPP. Through such a configuration, not only can messaging (information exchange) be carried out in real-time between the display apparatus and the multiple information terminal apparatuses (moderator terminal apparatus and user terminal apparatus), but the data exchanged through XMPP-based messaging and the data displayed in the display unit of the display apparatus can be associated with each other through the ID information with ease.

Furthermore, in the display apparatus configured as described above, information received by the communication unit may be an HTML file having extended meta-information. Here, an "HTML file having extended meta-information" refers to a file having data of a format that can be expressed by HTML (Hyper Text Markup Language) suited to communication based on XMPP (text data, image data, audio data, video data, and so on) and meta-information that is information related to that data (attribute information), and attribute information corresponding to messaging based on XMPP, such as the ID information and location information, is included in that meta-information. In this manner, using attribute information (ID information, location information) corresponding to messaging based on XMPP as meta-information is called "extending". Through such a configuration, as long as the data is expressed as HTML that is suited for communication based on XMPP, all formats of data that can be expressed by that HTML (text data, image data, audio data, video data, and so on) can be sent and received between the display apparatus and the multiple information terminal apparatuses, and the combinations thereof are not limited.

Furthermore, in the display apparatus configured as described above, the information received by the communication unit may be fragment information that configures display information for carrying out a display in the display unit. Through such a configuration, if, for example, fragment information that configures the display information for carrying out the display in the display unit is sent from the multiple information terminal apparatuses (moderator terminal apparatus and user terminal apparatus), the display apparatus can modify the display information for carrying out the display in the display unit based on the received fragment information. In other words, it is not necessary to send the entirety of the display information. Accordingly, it is possible to reduce the size of the information sent from the multiple information terminal apparatuses (moderator terminal apparatus and user terminal apparatus) to the display apparatus; this makes it possible to reduce the amount of time necessary for communication, and makes it possible to significantly reduce the load placed on the communication path between the display apparatus and the multiple information terminal apparatuses (moderator terminal apparatus and user terminal apparatus). As a result, the multiple users using the multi-user communication system can carry out communication in a more convenient manner.

Meanwhile, in order to achieve the stated object, a moderator terminal apparatus according to the present invention can be implemented as a moderator terminal apparatus that communicates with a display apparatus having a display unit over a network and that includes: a communication unit that sends, to the display apparatus, ID information for identifying data to be displayed in the display unit of the display apparatus, user information indicating the owner of the data, and access rights information that is set on a user-by-user basis for users using information terminal apparatuses that communicate with the display apparatus over a network and that indicates whether or not generation and changing of the data is permitted.

According to the moderator terminal apparatus configured as described above, not only can each piece of data to be displayed in the display unit of the display apparatus be controlled based on the ID information, but each piece of data to be displayed in the display unit of the display apparatus can be controlled in accordance with access rights set on a user-by-user basis for the multiple users using the multiple information terminal apparatuses (moderator terminal apparatus and user terminal apparatus) (that is, whether or not the generation and changing of the data is permitted). Accordingly, it is possible to enable smooth communication among the multiple users that are using the multiple information terminal apparatuses (moderator terminal apparatus and user terminal apparatus) in accordance with the access rights set for the respective multiple users.

Furthermore, in the moderator terminal apparatus configured as described above, the communication unit may send, to the display apparatus, the ID information, the user information, the access rights information, and location information indicating a display location of the data to be displayed in the display unit of the display apparatus.

Through such a configuration, the data can be displayed in the display unit of the display apparatus only in the case where the user that is the owner of the data identified by the ID information matches the user that has the access rights set on a user-by-user basis for the multiple users that use the multiple information terminal apparatuses (moderator terminal apparatus and user terminal apparatus) (in other words, whether or not the generation and changing of the data is permitted). Accordingly, it is possible to enable smooth communication in accordance with the access rights for each of the multiple users that are using the information terminal apparatuses (moderator terminal apparatus and user terminal apparatus).

Furthermore, the moderator terminal apparatus configured as described above may communicate with the display apparatus based on XMPP. Through such a configuration, not only can messaging (information exchange) be carried out in real-time with the display apparatus, but the data exchanged through XMPP-based messaging and the data displayed in the display unit of the display apparatus can be associated with each other through the ID information with ease.

Furthermore, in the moderator terminal apparatus configured as described above, information sent by the communication unit may be an HTML file with extended meta-information. Through such a configuration, as long as the data is expressed as HTML that is suited for communication based on XMPP, all formats of data that can be expressed by that HTML (text data, image data, audio data, video data, and so on) can be sent and received between the display apparatus and the moderator terminal apparatus, and the combinations thereof are not limited.

In the moderator terminal apparatus configured as described above, the information sent by the communication unit may be fragment information that configures display information for carrying out a display in the display unit of the display apparatus. Through such a configuration, if, for example, fragment information that configures the display information for carrying out the display in the display unit of the display apparatus is sent from the moderator terminal apparatus, the display apparatus can modify the display information for carrying out the display in the display unit based on the received fragment information. In other words, it is not necessary to send the entirety of the display information. Accordingly, it is possible to reduce the size of the information sent from the moderator terminal apparatus to the display apparatus; this makes it possible to reduce the amount of time necessary for communication, and makes it possible to significantly reduce the load placed on the communication path between the display apparatus and the multiple information terminal apparatuses (moderator terminal apparatus and user terminal apparatus). As a result, the multiple users using the multi-user communication system can carry out communication in a more convenient manner.

Meanwhile, in order to achieve the stated object, a user terminal apparatus according to the present invention can be implemented as a user terminal apparatus that communicates with a display apparatus having a display unit over a network and that includes a communication unit that sends the data to be displayed in the display unit, ID information for identifying the data, and user information indicating the owner of the data.

According to the user terminal apparatus configured as described above, not only can each piece of data to be displayed in the display unit of the display apparatus be controlled based on the ID information, but each piece of data to be displayed in the display unit of the display apparatus can be controlled in accordance with access rights set on a user-by-user basis for the multiple users using the multiple information terminal apparatuses (moderator terminal apparatus and user terminal apparatus) in the display apparatus (that is, whether or not the generation and changing of the data is permitted). Accordingly, it is possible to enable smooth communication among the multiple users that are using the multiple information terminal apparatuses (moderator terminal apparatus and user terminal apparatus) in accordance with the access rights set for the respective multiple users.

Furthermore, the user terminal apparatus configured as described above may communicate with the display apparatus based on XMPP. Through such a configuration, not only can messaging (information exchange) be carried out in real-time with the display apparatus, but the data exchanged through XMPP-based messaging and the data displayed in the display unit of the display apparatus can be associated with each other through the ID information with ease.

Furthermore, in the user terminal apparatus configured as described above, information sent by the communication unit may be an HTML file with extended meta-information. Through such a configuration, as long as the data is expressed as HTML that is suited for communication based on XMPP, all formats of data that can be expressed by that HTML (text data, image data, audio data, video data, and so on) can be sent and received between the display apparatus and the user terminal apparatus, and the combinations thereof are not limited.

In the user terminal apparatus configured as described above, the information sent by the communication unit may be fragment information that configures display information for carrying out a display in the display unit of the display apparatus. Through such a configuration, if, for example, fragment information that configures the display information for carrying out the display in the display unit of the display apparatus is sent from the user terminal apparatus, the display apparatus can modify the display information for carrying out the display in the display unit based on the received fragment information. In other words, it is not necessary to send the entirety of the display information. Accordingly, it is possible to reduce the size of the information sent from the user terminal apparatus to the display apparatus; this makes it possible to reduce the amount of time necessary for communication, and makes it possible to significantly reduce the load placed on the communication path between the display apparatus and the multiple information terminal apparatuses (moderator terminal apparatus and user terminal apparatus). As a result, the multiple users using the multi-user communication system can carry out communication in a more convenient manner.

Meanwhile, in order to achieve the stated object, a multi-user communication system according to the present invention can be implemented as a multi-user communication system in which the stated display apparatus and multiple information terminal apparatuses communicate over a network, the multiple information terminal apparatuses including the stated moderator terminal apparatus and the stated user terminal apparatus.

According to the multi-user communication system configured as described above, a moderator terminal apparatus that controls the data to be displayed in the display unit sends, to the display apparatus, the ID information for identifying the data to be displayed in the display unit, the user information indicating the user that is the owner of that data, and access rights information that is set on a user-by-user basis and that indicates whether or not to permit the generation and changing of the data. Then, the display apparatus determines whether or not to display the data identified by the ID information based on the received user information and access rights information, and displays the data in the display unit. Accordingly, not only can each piece of the data to be displayed in the display unit be controlled based on the ID information, but each piece of data to be displayed in the display unit of the display apparatus can also be controlled in accordance with access rights set on a user-by-user basis for the multiple users that use the multi-user communication system (in other words, whether or not the generation and changing of data is permitted). It is thus possible to enable smooth communication in accordance with the access rights among the respective multiple users.

Furthermore, the multi-user communication system configured as described above may be an electronic conference system. Through such a configuration, not only can each statement (data) presented in the virtual conference room (that is, the electronic conference system) be controlled with certainty and with ease based on the ID information, but it is also possible to control the statements (data) presented in the virtual conference room in accordance with access rights (in other words, whether or not to permit the presentation and editing of statements (data)) set for each of multiple participants (users) participating in the virtual conference room; accordingly, it is possible to enable the multiple participants (users) participating in the virtual conference room to communicate smoothly in accordance with their respective access rights.

Furthermore, in the multi-user communication system configured as described above, the display apparatus and the multiple information terminal apparatuses may carry out communication based on XMPP. Through such a configuration, not only can messaging (information exchange) be carried out in real-time between the display apparatus and the multiple information terminal apparatuses (moderator terminal apparatus and user terminal apparatus), but the data exchanged through XMPP-based messaging and the data displayed in the display unit of the display apparatus can be associated with each other through the ID information with ease.

According to the present invention, data can be controlled based on ID information and the data can be controlled in accordance with access rights to the data set on a user-by-user basis for the multiple users participating in the communication (that is, whether or not the generation and changing of the data is permitted). Therefore, it is possible to enable smooth communication that is compliant with the access rights among the respective multiple users.

The present invention can be usefully applied in a chat system to and from which information can be freely written/read and browsed within a community such as a household, a workplace, a school, and so on and in which multiple users can converse in real-time, and applied in an electronic conference system or the like in which multiple users can present ideas or opinions in a virtual conference room, and thus has industrial applicability.

What is claimed is:

1. A communication method comprising:
communicating between a display apparatus and multiple information terminal apparatuses over a network,
wherein said multiple information terminal apparatuses include a moderator terminal apparatus that immovably has authority to control data to be displayed in a display unit of said display apparatus;
said moderator terminal apparatus sends, to said display apparatus, ID information for identifying said data to be displayed in said display unit of said display apparatus, user information indicating a user that is an owner of said data, and access rights information that is set on a user-by-user basis for users that use said multiple information terminal apparatuses and indicates whether or not generation, changing, and display of said data is permitted; and
said display apparatus displays said data identified by said ID information in said display unit based on said user information and said access rights information.

2. The communication method according to claim 1,
wherein said multiple information terminal apparatuses further include a user terminal apparatus that sends said data to said display apparatus;
said user terminal apparatus sends, to said display apparatus, said data to be displayed in said display unit of said display apparatus, said ID information, and said user information; and
said display apparatus displays said data identified by said ID information in said display unit based on said user information and said access rights information.

3. The communication method according to claim 1,
wherein said display apparatus displays said data identified by said ID information in said display unit when a user permitted to generate, change, and display said data as indicated in said access rights information matches a user indicated in said user information.

4. The communication method according to claim 1,
wherein said moderator terminal apparatus further sends, to said display apparatus, location information indicating a display location of said data to be displayed in said display unit of said display apparatus; and
said display apparatus displays said data identified by said ID information in said display unit based on said access rights information, said user information, and said location information.

5. The communication method according to claim 4,
wherein said display apparatus displays said data identified by said ID information in a display location in said display unit indicated by said location information.

6. The communication method according to claim 1, wherein the communication method is employed in an electronic conference in which multiple users participate.

7. The communication method according to claim 1,
wherein said display apparatus and said multiple information terminal apparatuses carry out communication based on XMPP.

8. The communication method according to claim 7,
wherein information sent and received between said display apparatus and said multiple information terminal apparatuses is an HTML file with extended meta-information.

9. The communication method according to claim 8,
wherein the information sent and received between said display apparatus and said multiple information terminal apparatuses is fragment information that configures display information for carrying out a display in said display unit of said display apparatus.

10. A display apparatus comprising:
a display unit; and
a communication unit that communicates with multiple information terminal apparatuses including a moderator terminal apparatus and a user terminal apparatus over a network,
wherein said communication unit receives, from said moderator terminal apparatus that immovably has authority to control data to be displayed in said display unit, ID information for identifying said data, user information indicating an owner of said data, and access rights information that is set on a user-by-user basis for users that use said multiple information terminal apparatuses and indicates whether or not generation, changing, and display of said data is permitted, and receives, from said user terminal apparatus, said data to be displayed in said display unit, said ID information, and said user information indicating the owner of said data; and said display unit displays said data identified by said ID information based on said user information and said access rights information.

11. The display apparatus according to claim 10, wherein said display unit displays said data identified by said ID information when a user permitted to generate, change, and display said data as indicated in said access rights information matches a user indicated in said user information.

12. The display apparatus according to claim 10, wherein said communication unit further receives, from said moderator terminal apparatus, location information indicating a display location of said data to be displayed in said display unit; and said display unit displays said data identified by said ID information based on said access rights information, said user information, and said location information.

13. The display apparatus according to claim 12, wherein said display unit displays said data in the display location indicated by said location information.

14. The display apparatus according to claim 10, wherein said communication unit carries out communication with said moderator terminal apparatus and said user terminal apparatus based on XMPP.

15. The display apparatus according to claim 14, wherein information received by said communication unit from said multiple information terminal apparatuses is an HTML file with extended meta-information.

16. The display apparatus according to claim 15, wherein information received by said communication unit from said multiple information terminal apparatuses is fragment information that configures display information for carrying out a display in said display unit.

17. A moderator terminal apparatus comprising:
a communication unit that is connected to a display apparatus over a network; and
a control unit that sends, from the communication unit to the display apparatus, ID information for identifying data to be displayed in a display unit of said display apparatus, user information indicating an owner of said data, and access rights information that is set on a user-by-user basis for users using information terminal apparatuses that communicate with said display apparatus over the network and indicates whether or not generation, changing, and display of said data is permitted, wherein the moderator terminal apparatus immovably has authority to control the data to be displayed in the display unit.

18. The moderator terminal apparatus according to claim 17, wherein said communication unit further sends, to said display apparatus, location information indicating a display location of said data to be displayed in said display unit of said display apparatus.

19. The moderator terminal apparatus according to claim 17, wherein said communication unit communicates with said display apparatus based on XMPP.

20. The moderator terminal apparatus according to claim 19, wherein information sent by said communication unit to said display apparatus is an HTML file with extended meta-information.

21. The moderator terminal apparatus according to claim 20, wherein information sent by said communication unit to said display apparatus is fragment information that configures display information for carrying out a display in said display unit of said display apparatus.

22. A multi-user communication system, wherein the display apparatus according to claim 10 and multiple information terminal apparatuses including a moderator terminal apparatus and a user terminal apparatus communicate over a network,
the moderator terminal apparatus immovably having authority to control data to be displayed in a display unit of said display apparatus, and comprising:
a first communication unit that is connected to the display apparatus over the network; and
a first control unit that sends, from the first communication unit to the display apparatus, ID information for identifying the data to be displayed in the display unit of said display apparatus, user information indicating an owner of said data, and access rights information that is set on a user-by-user basis for users using information terminal apparatuses that communicate with said display apparatus over the network and indicates whether or not generation, changing, and display of said data is permitted,
the user terminal apparatus comprising:
a second communication unit that is connected to the display apparatus over the network; and
a second control unit that sends, from the second communication unit to the display apparatus, the data to be displayed in the display unit of said display apparatus, the ID information, and the user information.

23. The multi-user communication system according to claim 22, wherein the multi-user communication system is an electronic conference system.

24. The multi-user communication system according to claim 22, wherein said display apparatus and said multiple information terminal apparatuses carry out communication based on XMPP.

* * * * *